United States Patent
Hosner et al.

(10) Patent No.: US 9,895,025 B2
(45) Date of Patent: Feb. 20, 2018

(54) MOTOR UNIT OF HAND BLENDER

(71) Applicant: KONINKLIJKE PHILIPS N.V., Eindhoven (NL)

(72) Inventors: Mario Hosner, Eindhoven (NL); Martin Ewald Merl, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 78 days.

(21) Appl. No.: 14/899,189

(22) PCT Filed: Jun. 18, 2014

(86) PCT No.: PCT/EP2014/062874
§ 371 (c)(1),
(2) Date: Dec. 17, 2015

(87) PCT Pub. No.: WO2014/206844
PCT Pub. Date: Dec. 31, 2014

(65) Prior Publication Data
US 2016/0143482 A1   May 26, 2016

(30) Foreign Application Priority Data
Jun. 28, 2013   (EP) .................................. 13174346

(51) Int. Cl.
*A47J 43/00* (2006.01)
*A47J 43/044* (2006.01)
*A47J 43/08* (2006.01)

(52) U.S. Cl.
CPC ............ *A47J 43/044* (2013.01); *A47J 43/082* (2013.01); *A47J 2043/04409* (2013.01); *A47J 2043/04427* (2013.01)

(58) Field of Classification Search
CPC ........ A47J 43/082; A47J 43/08; A47J 43/044; A47J 2043/04427; A47J 2043/04409
See application file for complete search history.

(56) References Cited

U.S. PATENT DOCUMENTS

| 5,567,047 A | 10/1996 | Fritsch |
| 9,138,102 B2 | 9/2015 | Rosenwirth |
| 2005/0128865 A1* | 6/2005 | Chiappetta ........... A47J 43/0711 366/129 |

FOREIGN PATENT DOCUMENTS

| EP | 2193734 A1 | 6/2010 |
| EP | 2394548 A1 | 12/2011 |
| EP | 2465396 A1 | 6/2012 |
| JP | 0724509 A | 1/1995 |
| JP | 3097140 U | 7/2003 |

* cited by examiner

Primary Examiner — Tony G Soohoo
Assistant Examiner — Anshu Bhatia

(57) ABSTRACT

The motor unit (2) comprises a motor unit coupling part (22) for coupling a tool unit (3) to the motor unit. The tool unit will be coupled onto the motor unit via the motor unit's motor unit coupling part and the tool unit's tool unit coupling part. Coupling of the tool unit directly onto the end part of motor (20) reduces the tolerance along the longitudinal axis of the motor unit. Reduction of tolerance is advantageous as it reduces vibration and noise and as it reduces the load on the coupling parts.

4 Claims, 4 Drawing Sheets

MOTOR UNIT OF HAND BLENDER

This application is the U.S. National Phase application under 35 U.S.C. § 371 of International Application No. PCT/EP2014/062874, filed on Jun. 18, 2014, which claims the benefit of International Application No. 13174346.0 filed on Jun. 28, 2013. These applications are hereby incorporated by reference herein.

FIELD OF THE INVENTION

The invention relates to a motor unit for in arrangement with a tool unit comprising a motor, and an end part positioning the motor shaft on a longitudinal axis of the motor.

The invention relates to a hand blender comprising a tool unit and a motor unit as well.

BACKGROUND OF THE INVENTION

Conventional hand blenders comprise of a motor unit and several separable tool unit. Tool units are used for food processing such as cutting, chopping and blending. The motor drives a tool member, such as a chopper, cutter or blender, via the motor drive shaft, the coupling assembly and the tool drive shaft. The transfer of rotational movement from the motor shaft to the tool member and the transfer of axial, tangential and radial forces from the tool member to the motor shaft, due to the forces invoked by the processing of food, on top of tolerances due to material and geometric properties, lead to margins between the several elements of the hand blender. The design of two separable elements introduces an extra source of margin in the total tolerance chain of the hand blender. Tolerance causes noise and vibration, results in power loss and may lead to wear, damage and early failure.

OBJECT OF THE INVENTION

It is an object of the invention to reduce the tolerance between the motor unit and the tool unit of a hand blender.

SUMMARY OF THE INVENTION

In the motor unit according to the invention the end part further comprises a motor unit coupling part for coupling the tool unit to the motor unit. The tool unit will be coupled onto the motor unit via the motor unit coupling part and the tool unit's tool unit coupling part. The tool unit is coupled such that it is connected to the motor unit and that the tool unit follows the motion of the motor unit. Coupling of the tool unit directly onto the end part of motor reduces the tolerance along the longitudinal axis of the motor unit because the end part holds both the bearing positioning the motor shaft and the motor unit coupling part. Reduction of tolerance is advantageous as it reduces vibration and noise and as it reduces the load on the coupling parts.

The end part of the motor according to the invention preferably comprises an alignment zone for aligning the tool unit to the motor. The alignment zone for guiding and aligning the tool unit shaft guides the tool unit shaft in an axial and radial direction when a user mounts the tool unit onto the motor unit and aligns the tool drive shaft in a radial direction onto the motor drive shaft. Then the radial offset between the tool unit shaft and the motor drive shaft is minimized because the end part also positions the motor drive shaft. This is beneficial as the alignment zone for guiding and aligning reduces the radial tolerance between the tool unit and the motor. Tolerance reduction has a positive effect on the lifetime of among others the motor bearing, motor drive shaft and coupling components.

In another embodiment the motor unit coupling part comprises the alignment zone. Location of the alignment zone for guiding and aligning in the motor unit coupling part reduces the tolerance between the motor unit and the tool unit.

Positioning this aligning zone on the motor unit coupling part of the end part ensures that alignment is effected when coupling the motor unit to the tool unit.

Conveniently the end part comprises a fixating zone for fixating the tool unit to the motor. The fixating zone further enhances the positioning of the tool unit relative to the motor unit.

In another embodiment the motor unit coupling part comprises the fixating zone. Locating the fixating zone for fixating into the motor unit coupling part reduces the tolerance between the motor unit and the tool unit. Positioning this fixating zone on the motor unit coupling part of the end part further ensures that fixation is effected when coupling the motor unit to the tool unit.

Preferably the end part comprises a locking zone for locking the tool unit to the motor unit. The purpose of the locking zone for locking the tool unit is to prevent release of the tool unit in an axial direction from the motor unit. In use the tool unit is fixed in an axial direction to the motor unit using this locking zone thus ensuring that the motor drive shaft remains coupled to drive the tool drive shaft. This transfer enables the hand blender to process food. The locking zone enables the motor unit to release the tool unit when the user operates a release button.

In a preferred embodiment the motor unit coupling part comprises the locking zone. Location the locking zone in the motor unit coupling part is advantageous as it enables a more compact design. Users prefer a compact design.

Conveniently, the end part comprises a seal at an outer end of the end part. The sealing zone for sealing is advantageous at the outer end of the end part as the sealing zone may hinder food or water to enter the motor unit. When a user makes a mess of the food processing or when a user cleans the motor unit under streaming water, the sealing zone for sealing prevents the food or water from entering the motor unit. Having the seal at the outer end of the end part ensures that the seal is properly aligned.

Furthermore the end part according to the invention contributes to noise reduction, vibration reduction, a decrease of power loss and a less complicated design.

BRIEF DESCRIPTION OF THE DRAWINGS

These and other aspects of the motor unit and hand blender of the invention will be further elucidated and described with reference to the drawings in which.

DETAILED DESCRIPTION OF THE DRAWINGS

Figure 1A:
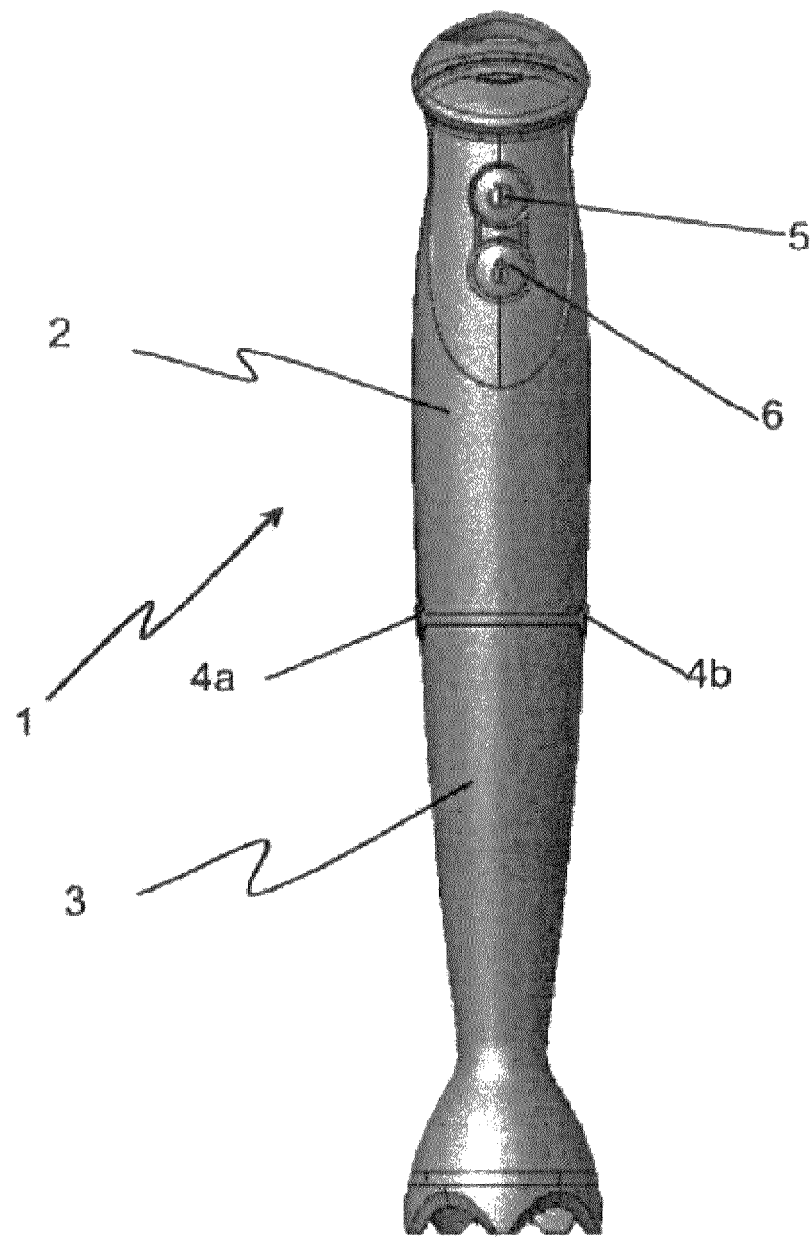
FIG. 1A depicts a side elevation of a hand blender with a first tool unit coupled to the blender motor unit.

FIG. 1A presents a side view of a hand mixing device or hand blender 1. The hand blender 1 comprises a motor unit 2 and a tool unit 3 that is coupled to the motor unit 2 by means of a coupling assembly (not visible). The motor unit 2 houses a motor (not shown) for driving the tool unit 3. The tool unit 3 is coupled such that it is connected to the motor unit 2 and that the tool unit 3 follows the motion of the motor unit 2: for example, when a user lifts the motor unit 2, because of the connection, the tool unit is lifted as well. The hand blender 1 is generally used as a kitchen appliance and can be used in the preparation of food. The tool unit 3 is detachably coupled to the motor unit 2 by means of a coupling assembly (not visible) of which one pushbuttons 4a and 4b, with which decoupling of the tool unit 3 and the motor unit 2 can be effected, are just visible. The motor unit 2 of the hand blender 1 further comprises control buttons 5, 6 with which a user can for example turn on and off the hand blender 1 and/or can control the speed of the hand blender 1. The tool unit 3 comprises a tool member, such as a cutting knife, which is at the lower end of the tool unit 3 and which may be used to cut food.

Figure 1B:
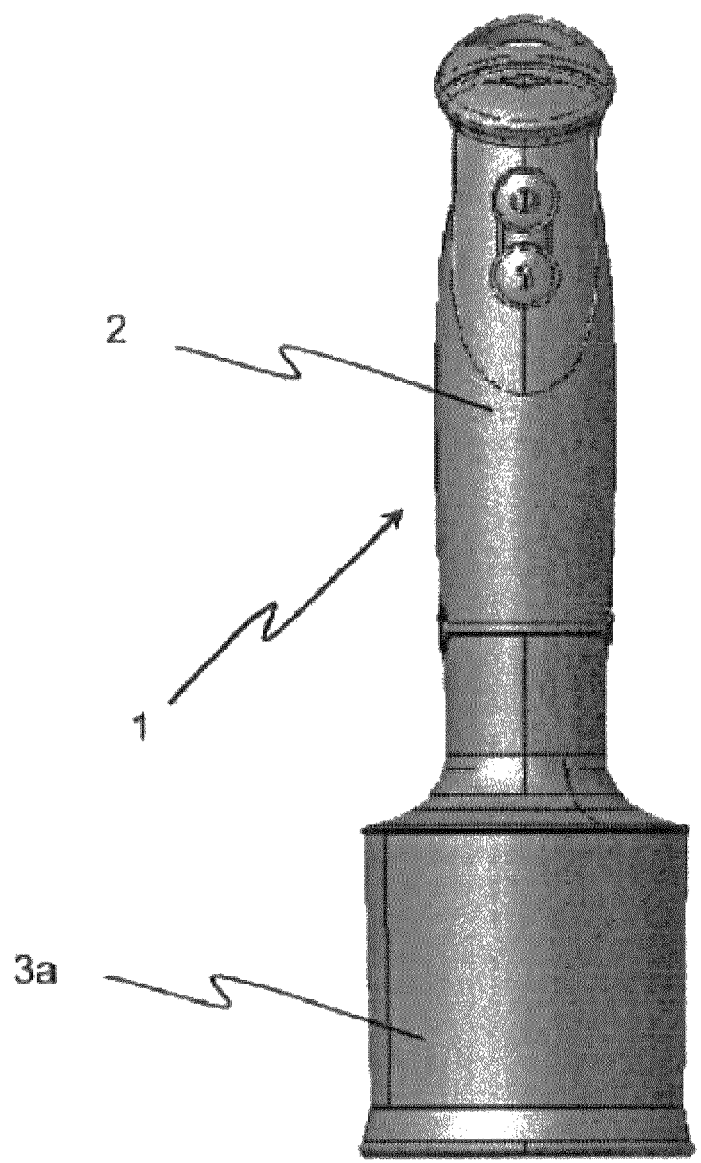
FIG. 1B depicts a side elevation of the hand blender of FIG. 1A now coupled with a second tool unit.

In the example of FIG. 1A the tool unit 3 is a so-called bar blender. Other tool units having different functions can also be coupled to the motor unit 2 by means of the coupling assembly. FIG. 1B gives an example of such another tool unit 3a which is known as a chopper.

Figure 2:
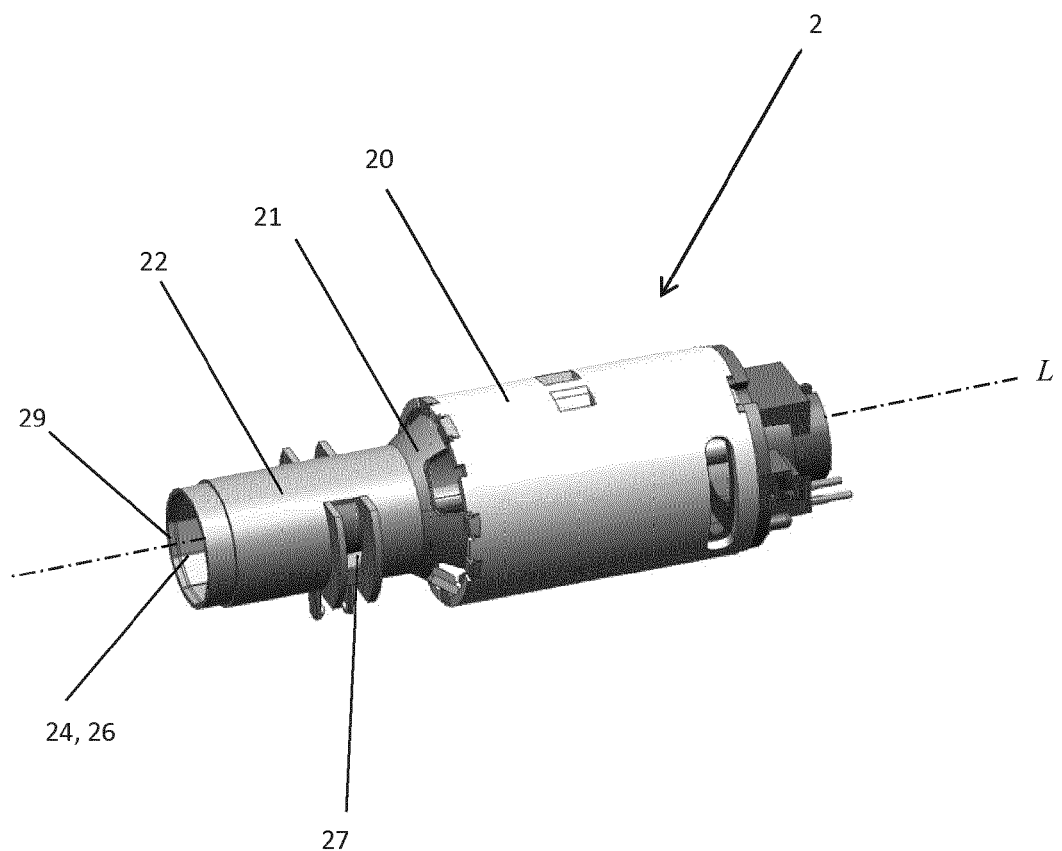
FIG. 2 depicts the interior of a motor unit according to the invention in a perspective view.
Figure 3:
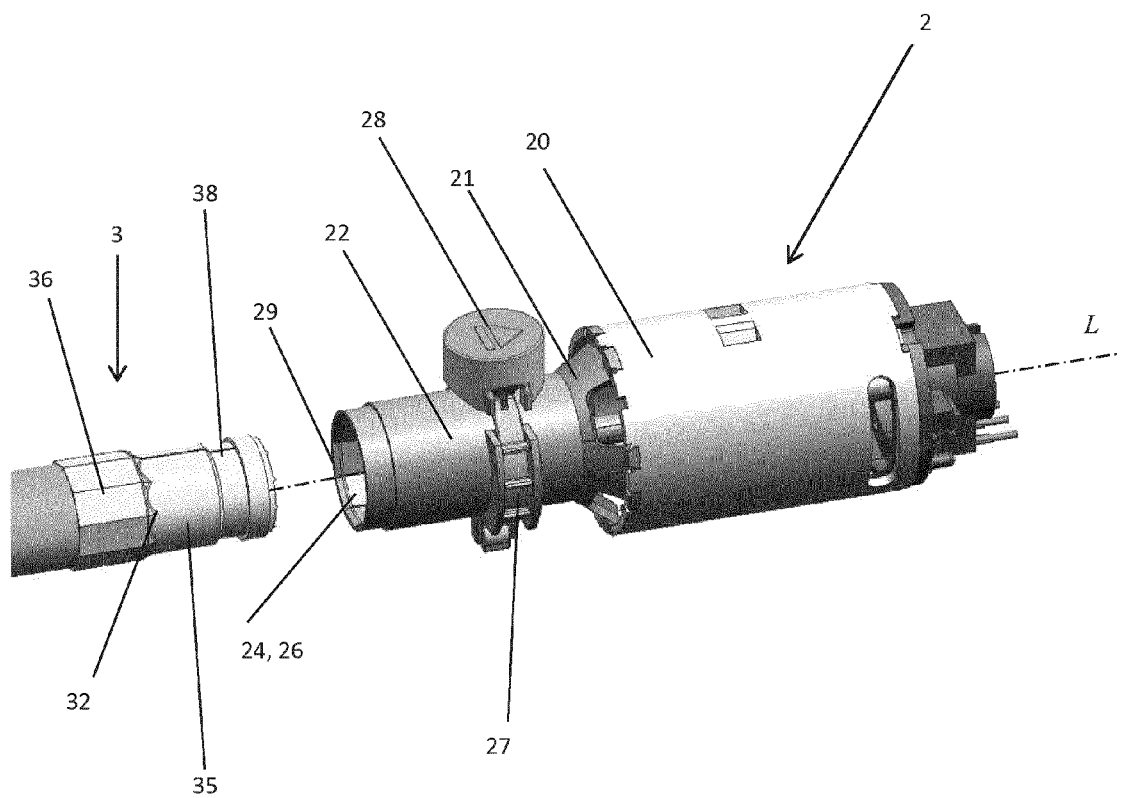
FIG. 3 depicts a motor unit according to the invention and a part of a tool unit according to the invention in a perspective view.

FIG. 2 presents a perspective view of the interior of a motor unit 2 according to the invention, while FIG. 3 presents a perspective view of the interior of a motor unit 2 according to the invention together with a part of a tool unit 3 according to the invention. The interior of the motor unit 2 houses an electric drive motor 20 which is coupled to and arranged for driving a motor drive shaft (not shown). The drive motor may be battery-powered or may be powered by mains. At one end of the drive motor 20 an end part 21 may be connected to the drive motor 20. An example of an end part is a motor shield. A motor shaft (not shown) is arranged in the motor 20 along longitudinal axis L. Conventionally a radial bearing (not shown) is located in the end part 21. The radial bearing is arranged in the end part around the motor shaft (not shown) to support the motor drive shaft (not shown) in a radial direction. The motor 20, the motor drive shaft (not shown), the end part 21 and the radial bearing (not shown) are arranged around the longitudinal axis L. A tool drive shaft (not shown) is arranged in the tool unit 3 to transfer the rotational forces invoked by the motor to a tool (not shown) for food processing. The motor drive shaft (not shown) is arranged to drive the tool drive shaft (not shown) of the tool unit 3.

The end part 21 according to the invention comprises a alignment zone for guiding and aligning a tool unit 23. The alignment zone for guiding and aligning the tool unit 23 is an alignment zone which guides the tool unit coupling part 32 to the motor unit coupling part 22 in radial and in axial direction. The alignment zone for guiding and aligning the tool unit 23 is shaped as an axisymmetric tube of which the axis of symmetry is the longitudinal axis L. The tool unit 3, including the tool unit coupling part 32, may be inserted into the alignment zone for guiding and aligning the tool unit 23. When inserting the tool unit 3 into the alignment zone for guiding and aligning the tool unit 23, the tool unit coupling part 32 moves towards the motor unit coupling part 22 in the end part 21 of the motor unit 2. The zone for aligning and guiding the tool unit (not shown) comprises a first motor unit coupling part (not shown). The first motor coupling surface (not shown) of the alignment zone for guiding and aligning the tool unit (not shown) has an axisymmetric shape, for example round. The tool unit coupling part 32 has a first tool coupling surface 35 having a similar axisymmetric shape as the first motor coupling surface (not shown), such that the tool unit coupling part 32 may fit in the motor unit coupling part 22. The shapes of the first tool coupling surface (not shown) and the first motor coupling surface 35 are compatible.

The shape of the alignment zone for guiding and aligning the tool unit 23 guides the tool unit 3 in an axial direction towards the motor unit, such that the tool unit coupling part 32 and the motor unit coupling part 22 may contact each other. Translation along the longitudinal axis L is still possible. Furthermore the shape of the alignment zone for guiding and aligning the tool unit 23 guides and aligns the tool unit in the radial direction such that the longitudinal axis of the tool unit overlaps the longitudinal axis of the motor unit L. The tool unit may rotate around the longitudinal axis L, but a transformation in a radial direction with respect to the longitudinal axis L is not possible.

In a preferred embodiment the second motor coupling surface 26 of the end part 21 is arranged to fixate the tool unit 3 in a tangential direction. Fixating the tool unit 3 in a tangential direction reduces the tolerance in a tangential direction, thus reducing noise and vibration in the hand blender 1 and reducing damage and wear of the hand blender 1. To properly fixating the tool unit 3, a non-axisymmetric profile is applied onto the second motor coupling surface 26, non-axisymmetry with respect to the longitudinal axis L. On the tool unit 3 a similar non-axisymmetric profile is applied onto the second tool coupling surface 36, such that the tool unit coupling part 32 may fit in the motor unit coupling part 22. The non-axisymmetric profile may be any shape which enables the tool unit 3 to fixate in a tangential direction onto the motor unit 2, such as a n-gon, where n is larger than 2, or a round shape comprising one protrusion. The shapes of the second tool coupling surface 36 and the second motor coupling surface 26 are compatible.

When a user turns on the hand blender 1, the motor 2 is started and the motor drive shaft (not shown) starts rotating. By means of the coupling assembly, a joint between the motor unit coupling part 22 and the tool unit coupling part 32, the rotation is transferred to the tool drive shaft (not shown). The tool drive shaft drives the tool member (not shown). The alignment zone for guiding and aligning a tool unit 23 and the fixating zone for fixating a tool unit 24 enable the motor drive shaft (not shown) to transfer the rotation to the tool drive shaft (not shown) without tolerance. The harmony between the motor coupling surfaces (not shown) and 26 and the tool coupling surfaces 35, 36 reduce the overall margin between the tool member and the motor 20 and thus reduce the amount of vibration and noise, power loss and damage and wear.

A locking zone for locking the tool unit 27 may be arranged on the end part 21 as well. The objective of the locking zone for locking the tool unit 27 is to hinder movement of the tool unit 3 with respect to the motor unit in an longitudinal direction L. The locking zone for locking the tool unit 27 comprises a knob 28. The tool unit 3 comprises a groove 38. The knob 28 is connected to a protrusion (not shown) which is arranged to fit into the groove 38. If the tool unit coupling part 32 is connected to the motor unit coupling part 22 and the tool unit 3 is axially aligned to the motor unit 2, the protrusion (not shown) slides into the groove 38, thus locking the tool unit in an axial direction. To unlock the tool unit 3 and to remove the tool unit 3 from the motor unit 2, a user needs to push the knob 28 to release the protrusion (not shown) from the groove 38.

At the outer end of the end part 21 which is not connected to the motor 20 a sealing zone for sealing 29 may be provided. The sealing zone for sealing 29 prevents that foreign material, such as food or water, enters the end part 21. When the tool unit 3 is connected to the motor unit 2, the sealing zone for sealing 29 closes off the radial tolerance between the tool unit 2 and the motor unit 3 at the outer end of the end part 21.

FIGS. 2 and 3 show a preferred embodiment of the invention wherein the tool unit coupling part 32 is arrangeable in the motor unit coupling part 22. However, in another embodiment the motor unit coupling part 22 may be designed such that the motor unit coupling part 22 is arrangeable in the tool unit coupling part 32.

The invention claimed is:

1. A hand blender comprising:
  a tool unit, wherein the tool unit comprises a tool unit coupling part; and
  a motor unit for use in arrangement with the tool unit, wherein the motor unit comprises
    (i) a motor that comprises a motor shaft, and
    (ii) an end part positioning the motor shaft on a longitudinal axis of the motor;
  wherein the end part further comprises a motor unit coupling part arranged to be coupleable to the tool unit coupling part of the tool unit,
  wherein the motor unit coupling part comprises (a) an alignment zone for aligning the tool unit to the motor and (b) a fixating zone for fixating the tool unit to the motor,
wherein the alignment zone of the motor unit coupling part is positioned within the end part closer to the motor than the fixating zone,
  wherein the alignment zone includes an axisymmetric tube with a first motor unit coupling surface,
  wherein the tool unit coupling part includes a first tool unit coupling surface,
  wherein the first motor unit coupling surface has an axisymmetric shape and the first tool unit coupling surface has a compatible axisymmetric shape similar to that of the first motor unit coupling surface, such that the tool unit coupling part fits in the motor unit coupling part and is guided in an axial direction towards the motor unit, wherein the axisymmetric shape of the first tool unit coupling surface guides and aligns the tool unit in the radial direction such that a longitudinal axis of the tool unit overlaps the longitudinal axis of the motor unit, wherein the tool unit may rotate, via the first tool unit coupling surface and first motor unit coupling surface, respectively, about the longitudinal axis, but movement in a radial direction with respect to the longitudinal axis is not possible, and
  wherein the fixating zone includes a second motor unit coupling surface of the axisymmetric tube, wherein the second motor unit coupling surface has a non-axisymmetric profile that is non-axisymmetric with respect to the longitudinal axis,
  wherein the tool unit coupling part further includes a second tool unit coupling surface, the second tool unit coupling surface having a compatible non-axisymmetric profile similar to that of the second motor unit coupling surface, such that the tool unit coupling part further fits in the motor unit coupling part in the axial direction towards the motor unit, via the second tool unit coupling surface and second motor unit coupling surface, respectively, to fixate the tool unit in a tangential direction in response to the second tool unit coupling surface being coupled with the second motor unit coupling surface.

2. The hand blender according to claim 1, wherein the end part further comprises a locking zone for locking the tool unit to the motor unit.

3. The hand blender according to claim 2, wherein the motor unit coupling part comprises the locking zone.

4. The hand blender according to claim 1, wherein the end part further comprises a sealing zone for sealing at an outer end of the end part.

* * * * *